United States Patent

[11] 3,552,532

| [72] | Inventors | Vernon H. Thomas<br>Marshall, Mich.;<br>Richard M. McGuire, Honolulu, Hawaii |
|---|---|---|
| [21] | Appl. No. | 751,800 |
| [22] | Filed | Aug. 12, 1968 |
| [45] | Patented | Jan. 5, 1971 |
| [73] | Assignee | Eaton Yale & Towne Inc.<br>Cleveland, Ohio<br>a corporation of Ohio |

[54] FLUID COUPLING DEVICE
2 Claims, 6 Drawing Figs.

[52] U.S. Cl. .................................................. 192/58,
192/82, 287/85, 308/238
[51] Int. Cl. ......................................................F16d 31/08,
F16d 43/25
[50] Field of Search........................................... 192/58,
58A1, 58A2, TO, 82; 230/271; 287/85; 308/238, N

[56] References Cited
UNITED STATES PATENTS

| 2,312,516 | 3/1943 | Alldredge.................. | 287/85 |
| 2,999,707 | 9/1961 | Kniepkamp et al........... | 287/85 |
| 3,033,624 | 5/1962 | Biesecker..................... | 308/238 |
| 3,055,473 | 9/1962 | Oldberg et al. ............... | 192/58(A1) |
| 3,174,600 | 3/1965 | Oldberg......................... | 192/58(A1) |

*Primary Examiner*—Allan D. Herrmann
*Attorney*—Yount, Flynn & Tarolli

ABSTRACT: A fluid coupling device includes relatively rotatable input and output members. The output member defines a working chamber in which a portion of the input member rotates, and a fluid in the working chamber transmits torque between the input and output members. A fluid reservoir is provided adjacent to the working chamber, and a flow of fluid is effected between the reservoir and the working chamber by operation of a flow control means. The flow control means includes a valve shaft located in an opening in the output member and an O-ring seal member provides a seal between the shaft and the output member. The seal has an external groove which abuts the surfaces of the output member surrounding the opening in which the shaft is disposed. The valve shaft is axially positioned in the opening by an annular groove formed in the valve shaft which receives an internal portion of the O-ring shaped seal member.

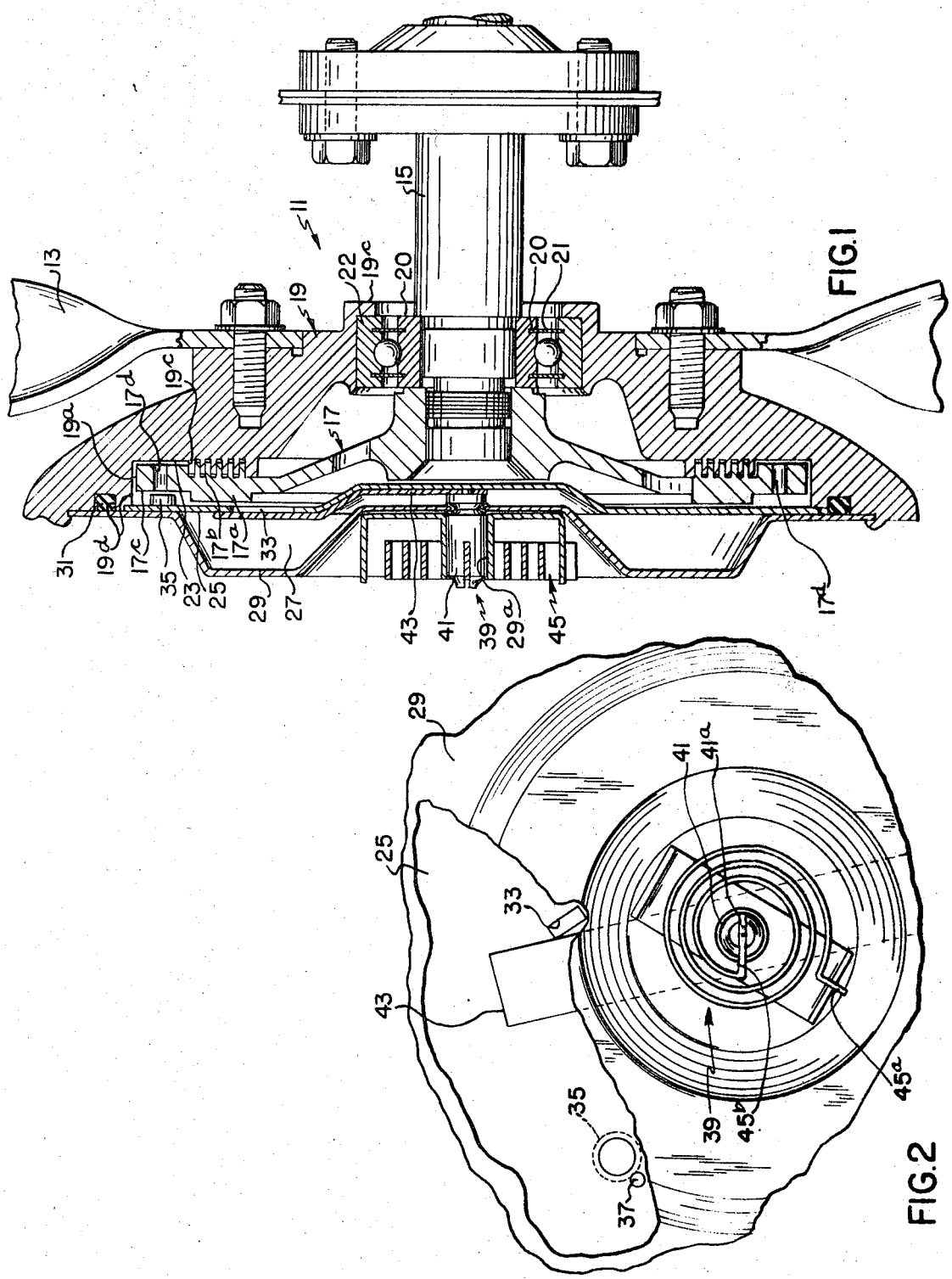

INVENTORS
VERNON H. THOMAS
RICHARD M. McGUIRE
BY
Yount, Flynn & Tarolli
ATTORNEYS

FLUID COUPLING DEVICE

The present invention relates to a drive coupling of the type embodying a fluid medium for transmitting torque between relatively rotatable input and output coupling members, and particularly to the type of fluid coupling wherein the quantity of torque transmitting fluid contained in a working chamber between the input and output coupling members can be varied to control the speed of the output member.

Fluid coupling devices of the above-noted type are usable for driving various types of load devices, and have particular utility for driving an engine accessory, such as a cooling fan device of an internal combustion engine. Fluid coupling devices used to drive fans are provided with flow control means to vary the quantity of fluid in the working chamber in response to the cooling requirements of the fan. Accordingly, when the cooling requirements of the fan are increased, the quantity of torque-transmitting fluid in the working chamber is increased to provide an increase in the speed of the output coupling member relative to the input member, and thereby increase the speed of the fan. Conversely, when the cooling requirements of the fan are decreased, the quantity of torque-transmitting fluid in the working chamber is reduced to decrease the speed of the output coupling member relative to the input member, and thereby decrease the speed of the fan.

In the past, the fluid coupling devices have been provided with flow control means which provide a flow of fluid between a fluid reservoir and the working chamber with the quantity of torque-transmitting viscous fluid present in the working chamber being determined by the difference in the rate of fluid flow into and out of the working chamber. One type of flow control means comprises a valve operated by temperature-responsive means to control the rate at which the fluid flows from the reservoir into the working chamber. Such a valve is disclosed in U.S. Pat. No. 3,055,473, wherein an opening formed in a wall of the reservoir is in fluid communication with the working chamber and adapted to be closed by a valve arm attached to a shaft. The shaft is rotatably disposed in fluid-sealing relation in another wall of the reservoir and connected to a temperature-responsive means which causes the shaft to rotate in response to temperature changes, thereby moving the valve arm over the opening to restrict the flow of fluid from the reservoir to the working chamber.

For such a valve to be effective, it is desirable that the shaft by axially positioned in the opening of the reservoir wall in which it is rotatably disposed so that the valve arm connected with the shaft is properly positioned with respect to the wall in which the fluid opening is formed to effectively limit or stop the flow of fluid through the opening. The attainment of this axial positioning has made the assembly of a viscous coupling relatively troublesome. Moreover, the seal construction provided between the shaft and the reservoir has been relatively complex and expensive to manufacture. In certain couplings, such as shown in U.S. Pat. No. 3,055,473, progressive stamping of the parts is necessary to construct the coupling cover so that it properly cooperates with an O-ring seal. This adds to the problems of manufacture and to the cost of the coupling.

Accordingly, the principal object of the present invention is the provision of a new and improved viscous coupling wherein the aforementioned assembly problem is lessened and at the same time the seal construction between the shaft and reservoir is simplified and may be easily manufactured at low cost without progressive stamping.

Another object of the present invention is the provision of a new and improved fluid coupling in which the volume of fluid within the working chamber thereof can be varied by operation of a flow control means which includes a shaft member located in an opening in the wall of the fluid coupling and wherein a fluidtight seal is provided between the shaft member and the wall in a simple and reliable manner.

Another object of the present invention is the provision of a new and improved fluid coupling, as noted in the next preceding paragraph, wherein the seal is effected by an O-ring seal which is mounted on the wall of the fluid coupling and engages a portion of the shaft upon insertion of the shaft into the opening and thereby facilitate assembly of the fluid coupling.

Another object of the present invention is the provision of a new and improved fluid coupling, as noted above, wherein the O-ring seal has an outer groove therein in which the wall portion of the fluid coupling is received and the shaft has a V-shaped groove therein in which the internal surface of the O-ring is received.

Still other objects, features, and advantages of the present invention will become apparent to those skilled in the art from the following description of a preferred embodiment of the invention, taken in conjunction with the accompanying drawings, wherein:

FIG. 1 is an axial sectional view of a fluid coupling device embodying the present invention;

FIG. 2 is a partial plan cutaway view of the fluid coupling device shown in FIG. 1;

Figure 3:
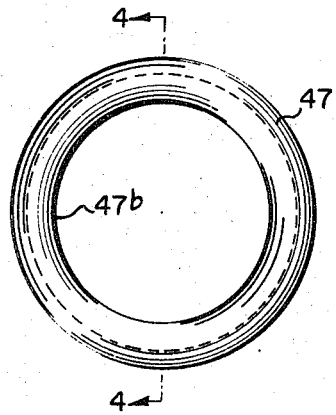
FIG. 3 is a plan view of a seal used in the fluid coupling of FIG. 1.

Referring now in detail to the FIGS. of the drawings, a fluid coupling device 11 is connected to a load in the form of a fan 13 and disposed on the end of an input shaft 15. The shaft 15 upon rotation drives the load 13 through the fluid coupling device 11. The fluid coupling device 11 includes an input member 17 and an output member 19. The output member 19 is supported for rotation relative to the shaft 15 by a ball bearing assembly, generally indicated at 21, having inner and outer raceways 20 and 22, respectively. The end of the shaft 15 is secured to the input member 17 so that the shaft 15 and input member 17 rotate together.

As is known, the input member 17 drives the output member 19 by an annular flange portion 17a of the input member 17 rotating in a quantity of viscous fluid in a working chamber 23 provided by the output member 19. The working chamber 23 is formed by an annular recess 19a in the outboard side of the output member 19, which receives the annular flange portion 17a of the input member, and a disc-shaped valve plate 25 which covers the outboard side of the working chamber 23 and forms a part of the output member 19.

The annular flange portion 17a of the input member is spaced from the surface of the annular recess 19a in the output member to provide a shear space for receiving the viscous fluid. A plurality of concentric axially overlapping and mating lands and grooves 17b, 19c are provided on the surfaces of the annular flange 17a and the annular recess 19a which face each other.

A fluid reservoir, generally indicated at 27, is provided adjacent to the working chamber 23 on the outboard side of the output member 19. The fluid reservoir 27 is formed by a disc-shaped cover plate 29 which is placed over the disc-shaped plate 25 and fixedly secured throughout its annular edge to the output member. The cover plate 29 abuts the periphery of the disc-shaped plate 25 and is sealed to prevent leakage by an O-ring 31 disposed in an annular groove 19d formed in the output member 19 between the annular edges of the plate 25, 29.

To vary the torque transmitted between the input and output members 17, 19, flow control means are provided to vary the quantity of fluid in the working chamber 23. Although other conventional and known flow control means may be utilized to vary the quantity of fluid in the working chamber 23, in the illustrative embodiment, this is accomplished by providing means to effect a flow of fluid between the reservoir 27 and the working chamber 23 and control means 39 to control the flow of fluid. In the illustrative embodiment, the flow of fluid from the reservoir 27 to the working chamber 23 is through an inlet opening 33 in the valve plate 25.

Fluid flow from the working chamber 23 into the reservoir 27 is effected by pump means in the form of a tab 35 on the valve plate 25. The tab 35 projects into an annular groove 17c formed in the outboard side of the input member 17 in alignmemt with a pair of laterally opposite ports 17d. In addition, the tab 35 is circumferentially positioned on the valve plate 25 so as to lead an outlet opening 37 upon rotation of the output member 19. The direction of rotation of the fluid coupling device is indicated by the arrow in FIG. 1 of the drawings.

Since the input member 17 is driven, it rotates at a faster speed than the output member 19. The difference in speed between the input and output members causes the fluid in the annular groove 17c of the input member 17 to impact against the tab 35, thereby creating a fluid pressure adjacent the tab and as a result the fluid flows from the working chamber 23 through the outlet opening 37 and into the reservoir 27.

The torque transmitted from the input member 17 to the output member 19 is a function of the quantity of fluid in the working chamber 23. Since the area of the inlet opening 33 is larger than the area of the outlet opening 37, the flow of fluid from the reservoir 27 into the working chamber 23 is greater than the flow of fluid out of the working chamber to the reservoir.

The control means 39 is provided to control the flow of fluid into the working chamber 23 through the inlet opening 33. The control means 39 includes a control shaft 41 which is rotatably disposed in a shaft opening 29a in the cover plate 29 and extends into the fluid reservoir 27, and a valve arm 43 which is located in the reservoir 27 and suitably attached to an end of the control shaft 41. When the valve arm 43 is positioned closely adjacent to the outboard surface of the valve plate 25 and positioned over a portion of the inlet opening 33 formed in the valve plate, it is effective to restrict the flow of fluid from the reservoir 27 into the working chamber 23. By closing the opening 33 with the valve arm 43, the quantity of the fluid in the working chamber 23 is reduced and the torque transmission between the input and output members 17, 19 is likewise reduced.

The fluid coupling device 11 is operated in response to the cooling requirements of the fan 13 by providing a sensing means, generally indicated at 45, in operating relationship with the control means 39 and responsive to conditions external of the coupling device 11. In the illustrative embodiment, the sensing means 45 is in the form of a helically wound, bimetallic, temperature responsive coil. The coil is disposed on the outboard side of the cover plate 29 and has one end 45a secured to the cover plate and the other end 45b secured in a slot 41a formed in the control shaft 41 rotatably disposed in the cover plate. The coil expands and contracts in response to temperature changes to rotate the control shaft 41, and thereby moves the valve arm 43 away from or towards the inlet opening 33. Accordingly, when the temperature increases and causes a corresponding increase in the cooling requirement, the coil expands and rotates the valve arm 43 away from the inlet opening 33 to increase the torque transmission of the coupling device 11. Conversely, when the temperature decreases, the coil contracts and rotates the valve arm 43 over the inlet opening 33 to decrease the torque transmission of the fluid coupling device 11. Since the angle through which the valve arm rotates is related to the degree of temperature change, the area of the fluid inlet opening 33 through which fluid may flow is varied from fully open to fully closed with corresponding variations in torque transmission of the fluid coupling device 11 from maximum to minimum. While the description and drawings illustrate a single inlet opening 33, outlet opening 37, and tab 35, these structures are preferably duplicated at diametrically opposite locations, and the valve arm 43 extends so as to control both inlet openings.

From the foregoing, it will be appreciated that the axial position of the shaft 41 in the cover plate 29 determines the position of the valve arm 43 relative to the valve plate 25. This has in the past created assembly problems. Moreover, it should be appreciated that a fluidtight seal is necessary between the shaft 41 and the cover plate 29.

In accordance with the present invention, a simple inexpensive seal arrangement is provided between the shaft 41 and the cover plate 29 and which seal arrangement also effects the axial positioning of the shaft 41 to facilitate assembly. The seal arrangement includes a seal member 47 which is attached to the shaft opening 29a in the cover plate 29.

Figure 4:
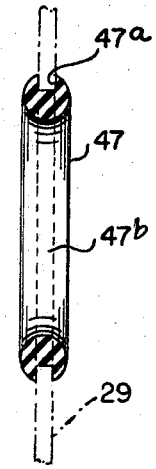
FIG. 4 is a cross-sectional view of the seal, taken on the line 4—4 of FIG. 3.

The seal member 47, as clearly shown in FIGS. 3 and 4, is in the form of an O-ring having an external circumferential groove 47a. The seal member 47 is constructed from a suitable resilient material and is disposed in the shaft opening 29a formed in the cover plate 29 for receiving the control shaft 41. When the seal 47 is properly fitted into the shaft opening 29a of the cover plate 29, the portion of the plate defining the shaft opening 29a is located in the circumferential groove 47a in a tight-fitting fluid-sealing relation. The seal 47 has a central opening therein defined by an inner portion 47b through which the shaft 41 extends.

Figure 5:
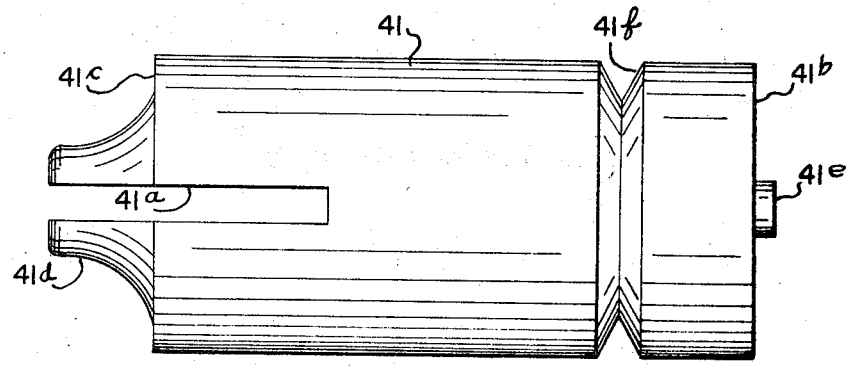
FIG. 5 is a side view of a shaft used in the fluid coupling of FIG. 1.
Figure 6:
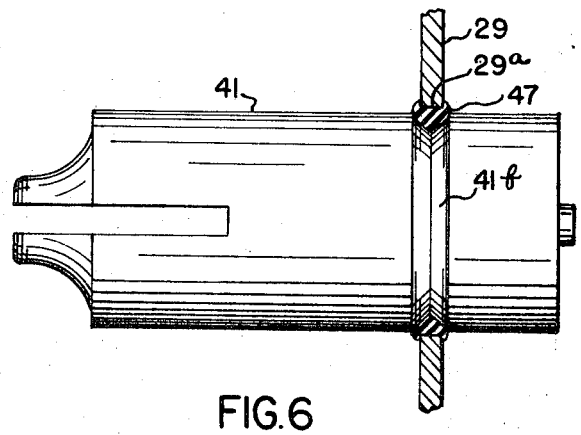
FIG. 6 is a fragmentary view illustrating the sealing of the shaft in a wall of the fluid coupling.

The control shaft 41, constructed in accordance with the present invention, is shown in FIG. 5. The control shaft 41 is generally cylindrical with a diameter smaller than the shaft opening 29a formed in the cover plate 29, but larger than the diameter of the opening in the seal 47. The control shaft 41 has inboard and outboard ends 41b, 41c, respectively, with the transverse slot 41a being formed in the outboard end 41c of the shaft for receiving the end 45b of the bimetallic temperature-responsive coil 45. In addition, a reduced portion 41d is provided at the outboard end 41c of the shaft which is adapted to be pinched together to retain the end of the coil in the shaft. The inboard end 41b of the control shaft has a cylindrical stub 41e projecting therefrom and is adapted to have the valve arm 43 suitably attached thereto. At an axially spaced distance from the inboard end 41b of the control shaft, an annular relief 41f is provided in the form of a V-shaped groove.

During assembly, the control shaft 41 is pressed into the pliable seal 47 until the annular relief 41f is aligned with the seal, whereupon the inner portion 47b of the seal expands into the annular relief 41f and engages the walls defining the relief 41f to provide a seal therebetween. With the seal member 47 disposed in the annular relief 41f, the control shaft is free to rotate when a torque is exerted on it by the temperature-responsive coil 45. In addition, the annular relief 41f is axially spaced so as to position the valve arm 43 attached to the inboard end of the control shaft 41 closely adjacent to the valve plate 25.

The seal member 47 and control shaft 41, constructed in accordance with the present invention facilitate the assembly of the fluid coupling device 11. The seal member 47 is fist inserted into the shaft opening 29a of the cover plate 29, and the wall portion of the cover plate 29 surrounding the shaft opening 29a is received in the external annular groove 47a formed in the seal member 47. With the seal member 47 properly fitted in the shaft opening 29a, the control shaft 41 with the arm 43 thereon is pressed through the seal member 47 until the inner portion 47b of the seal expands into the annular groove 41f of the control shaft. Due to the abutment of the seal and the surfaces defining the groove 41f, the control shaft 41 is properly axially positioned in the opening 29a so that the valve arm 43 is properly located with respect to the valve plate. When the seal 47 engages the annular groove 41f, the control shaft 41 is axially aligned with the cover plate 29 and rotatably mounted therein in fluid-sealing relation. Once the control shaft 41 is properly mounted in the cover plate, the end 45b of the bimetallic temperature-responsive coil 45 is inserted in the transverse slot 41a formed in the outboard portion 41c of the shaft and the reduced portion 41d is pinched together to firmly hold the end of the coil in the slot.

With the seal member 47 and the control shaft 41 properly installed in the cover plate 29, the cover plate may then be secured to the output member 19 to form the fluid reservoir. Since the annular groove 41f in the control shaft 41 is formed in axially aligning spaced relation from the valve arm 43, when the cover plate 29 is properly secured to the output member 19, the valve arm 43 is positioned closely adjacent to the valve plate 25 so as to effectively restrict or stop the flow of fluid when the valve arm 43 is moved over the inlet opening 33. Also, since the fluid seal 47 engages the control shaft 41 in a manner that does not hinder the rotational movement of the shaft, the valve arm 43 is free to rotate over the inlet opening 33 in response to a torque exerted on the shaft by the expansion or contraction of the bimetallic temperature-responsive coil 45.

While the invention has been illustrated and described with a single preferred embodiment, it will be apparent to those skilled in the art that various embodiments, modifications, and improvements may be made without departing from the spirit and scope of the invention. Accordingly, it is to be understood that the invention is not to be limited by the illustrative embodiment, but is to include all embodiments, changes, and improvements coming within the scope of the appended claims.

We claim:

1. A fluid coupling device comprising relatively rotatable first and second coupling members, said second coupling member defining a working chamber having at least a portion of said first coupling member disposed therein, said working chamber being adapted to contain a quantity of viscous fluid to enable torque to be transmitted between said first and second coupling members, wall means for defining a fluid reservoir, said wall means including an inner wall mounted on said second coupling member and separating said working chamber from said fluid reservoir and an outer wall mounted on said second coupling member spaced apart from and cooperating with said inner wall to at least partially define the fluid reservoir, said inner wall having a first opening formed therein for providing fluid communication between said working chamber and said fluid reservoir, said outer wall having a second opening formed therein, and flow control means for regulating fluid flow through said first opening to at least partially control the quantity of fluid in said working chamber, said flow control means comprising a rotatable shaft member extending through said second opening in said outer wall, a valve member comprising a single valve arm mounted on an inner end portion of said shaft and located in said reservoir adjacent to said inner wall, said valve member being movable relative to said inner wall between a closed position in which an outer end portion of said valve arm covers said first opening to block fluid flow through said first opening and an open position in which the outer end portion of said valve arm at least partially uncovers said first opening to enable fluid to flow through said first opening, seal means disposed in said second opening between said shaft and said outer wall for preventing leakage of fluid from said reservoir through said second opening, for axially positioning said shaft during assembly to locate said valve member adjacent to said inner wall and for thereafter retaining said shaft against axial movement to maintain said valve member adjacent to said inner wall during movement of said valve member between the open and closed positions, said seal means including an outer rim portion disposed in engagement with opposite sides of said outer wall to retain said seal means against axial movement relative to said outer wall, said shaft member having opposing surfaces disposed in abutting engagement with inner and outer surface areas of said seal means to retain said shaft member in a predetermined axial position relative to said outer wall and to retain said valve member against movement toward and away from said inner wall, and temperature-responsive means operatively connected to said outer wall and an outer end portion of said shaft member for effecting rotational movement to said shaft and valve member in response to variations in temperature to thereby effect movement of said valve member between the open and closed positions with variations in temperature.

2. A fluid coupling device as set forth in claim 8 wherein said seal means is in the general form of an O-ring, said inner and outer surface areas of said seal means being disposed on opposite sides of an interior portion of said O-ring, said opposing surfaces of said shaft member at least partially defining an annular groove for receiving the interior portion of said O-ring.